United States Patent [19]
Williams et al.

[11] Patent Number: 5,962,606
[45] Date of Patent: Oct. 5, 1999

[54] CONTROL OF SOLUTION CATALYST DROPLET SIZE WITH AN EFFERVESCENT SPRAY NOZZLE

[75] Inventors: Clark Curtis Williams, Charleston; Mark Gregory Goode, Hurricane, both of W. Va.; Arakalgud Venkatapathia Ramamurthy, Bound Brook, N.J.

[73] Assignee: Union Carbide Chemicals & Plastics Technology Corporation, Danbury, Conn.

[21] Appl. No.: 08/802,231

[22] Filed: Feb. 19, 1997

[51] Int. Cl.[6] ............................................ C08F 2/34
[52] U.S. Cl. .................. 526/88; 526/86; 526/127; 526/160; 526/901; 526/904; 526/348.5; 526/943; 502/9; 502/155
[58] Field of Search ............................ 526/86, 88, 160, 526/127, 901, 943, 904; 502/9

[56] References Cited

U.S. PATENT DOCUMENTS

| | | | |
|---|---|---|---|
| 4,163,040 | 7/1979 | Van den Bossche | 422/131 |
| 4,222,986 | 9/1980 | Smith et al. | 422/131 |
| 4,640,463 | 2/1987 | Krambeck et al. | 239/424 |
| 5,174,889 | 12/1992 | Nielsen | 208/113 |
| 5,269,980 | 12/1993 | Levendis et al. | 264/9 |
| 5,317,036 | 5/1994 | Brady, III et al. | 523/223 |
| 5,541,270 | 7/1996 | Chinh et al. | 526/68 |
| 5,693,727 | 12/1997 | Goode et al. | 526/86 |

FOREIGN PATENT DOCUMENTS

| | | |
|---|---|---|
| 0 764 665 | 3/1997 | European Pat. Off. . |
| 0 811 637 | 12/1997 | European Pat. Off. . |
| 61-207402 | 9/1986 | Japan . |
| 94/28032 | 12/1994 | WIPO . |
| 9620780 | 7/1996 | WIPO . |
| 9718888 | 5/1997 | WIPO . |

OTHER PUBLICATIONS

Lund, M.T., P.E. Sojka, A.H. Lefebvre & P.G. Gosselin, "Effervescent Atomization at Low Mass Flow Rates. Part I: The Influence of Surface Tension", *Atomization and Sprays*, Begell House, Inc., 1993, vol. 3, pp. 77–89.

Santangelo, Philip J. & Paul E. Sojka, "A Holographic Investigation of the Near–Nozzle Structure of an Effervescent Atomizer–Produced Spray", *Atomization and Sprays*, Begell House, Inc., 1993, vol. 5, pp. 137–155.

Sales Brochure—Heat Systems–Ultrasonics, Inc., 1938 New Highway, Farmingdale, NY 11735, 1986.

Chen, S.K. and A.H. Lefebvre, "Influence of Ambient Air Pressure on Effervescent Atomization", *Journal of Propulsion and Power*, vol. 9, No. 1, Jan.–Feb. 1993, pp. 10–15.

Whitlow, J.D. and A.H. Lefebvre, "Effervescent Atomizer Operation and Spray Characteristics", *Atomization Sprays*, Begell House, Inc., 1993, vol. 3, pp. 137–155.

*Primary Examiner*—David W. Wu
*Attorney, Agent, or Firm*—P. A. Doody

[57] ABSTRACT

The present invention teaches the use of an effervescent nozzle to deliver liquid catalyst to a gas phase polymerization system.

19 Claims, 2 Drawing Sheets

CONTROL OF SOLUTION CATALYST DROPLET SIZE WITH AN EFFERVESCENT SPRAY NOZZLE

FIELD OF THE INVENTION

A method of controlling the size of drops of liquid catalyst entering a gas phase polymerization reactor is taught herein to prevent the formation of large flaky particles which result from the use of liquid catalysts. Said control is affected using an effervescent spray nozzle which produces fine catalyst droplet dispersion, resulting in small spherical primary particles and small particle agglomerates.

BACKGROUND OF THE INVENTION

U.S. Pat. No. 5,317,036 teaches the gas-phase polymerization of olefins with catalysts in liquid form. In such systems resin particle size can be controlled by spraying the liquid catalyst into a zone which is substantially free of resin as disclosed in pending U.S. patent application Ser. No. 08/659,764, now U.S. Pat. No. 5,693,727 which is incorporated herein by reference. This process allows a brief period of time for the spray droplets to undergo evaporation and polymerization before contacting the polymer particles already in the reactor, thus reducing the tendency for the droplets to adhere to them. The "particle-lean" zone is preferably created by feeding a jet of heated monomer or cycle gas into the side of the reactor.

However, such feed systems often yield particle agglomerates which restrict reactor operability. These particles exhibit a flaky or hollow sphere morphology and result in bulk densities below 160 kg/m$^3$. These particles have a high ratio of cross section to mass and are readily entrained out the top of the fluidized bed, and thereby accumulate in the cycle gas cooler, the compressor suction screen, and the distributor plate. These particles also restrict the flow of resin out of the reactor and in the downstream conveying lines. Avoidance of these types of particles is essential for commercial operation of catalysts in a liquid form.

SUMMARY OF THE INVENTION

It has been found that the use of an effervescent nozzle to deliver a catalyst in liquid form eliminates the formation of large droplets of catalyst. This reduction in the formation of large catalyst drops allows for the control of catalyst particle size and thereby, polymer particle size, avoiding the formation of large flaky resin agglomerates. This nozzle also allows for control of the ultimate resin particle size by varying the flowrates of the atomization gas and/or the isopentane catalyst diluent.

DETAILED DESCRIPTION OF THE INVENTION

Figure 1:
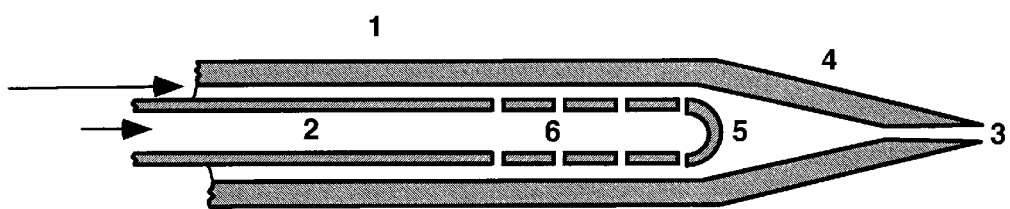
FIG. 1 illustrates an exemplary effervescent nozzle for use according to the present invention.

It is suspected that the large hollow clusters of polymer which can be produced when using a catalyst in a liquid form in a gas phase polymerization reactor result from large droplets of the catalyst, which are either formed in the injection tube or during coalescence in the liquid spray. Either in flight, or upon contact with resin in the reactor, these large droplets contact a large number of small droplets or particles which adhere to the droplet surface. The solvent, if any, in the catalyst droplet evaporates, depositing the catalyst on the inside surface of the spherical assembly. This deposited catalyst aids polymerization at this site and thereby cements the small particles onto the surface of the expanding spherical cluster, which can eventually break open producing a flaky structure. Thus, the prevention of the formation of these large catalyst droplets is believed to provide a solution to the excessive resin agglomeration and flaking problem.

Currently, it has been found that the size of the droplets may be controlled through the appropriate use of an effervescent nozzle. With effervescent nozzles, a stream of liquid or gas is passed through an inner tube, while a liquid or gas is passed cocurrently through an annular space defined by the inner tube and a concentric outer tube. The direction of flow of the liquid and gas is generally along the central axis of the tubes. Catalyst solution or atomization gas are fed through their respective inlets and exit through a common orifice at the spray tip. Towards the tip of the inner tube, though not necessarily at the end, there are holes (orifices) which allow the gas to enter the liquid. The gas is introduced into the cocurrent flowing liquid near the common exit orifice. In this way, liquid slugging is prevented and steady droplet formation occurs. Gas bubbles which are formed are forced through an orifice at the tip of the outer tube, forcing the concurrent flow of liquid along the outside edge of the orifice. The thin film of liquid on the orifice wall is ejected from the orifice in thin sheets which disintegrate into small droplets. The gas bubbles are thought to rapidly increase in volume as they emerge form the orifice, providing additional energy which shatters the liquid into small droplets.

This is a distinction over certain delivery systems in that the direction of flow of gas and liquid is the same, both driving for delivery of the catalyst into the reactor. Moreover, there is no separate mixing chamber for gas and liquid; rather, the two phases mix midstream. It is noted that the effervescent nozzles do not change the direction of flow of the gas and liquid at the point of have been combination. Instead, the spray is in the direction of flow of the feed lines. However, the effervescent nozzle may be a perpendicular nozzle wherein the gas and liquid after they have been combined exit through the orifice in a direction perpendicular to the flow direction.

The nozzle can produce droplets of a desired average size (0.005 to 0.30 mm) within a narrow size distribution. The droplet size can be adjusted without disturbing the ongoing polymerization reaction by regulating liquid and gas flow rates. A narrow distribution of droplet size, from about 0.005 to about 0.300 mm, preferably about 0.010 to 0.075 mm, can prevent the formation of large agglomerates resulting from large droplets and the formation of fines resulting from small droplets. Under many conditions, however, a wide droplet size distribution is acceptable since the smaller droplets can agglomerate to some degree with the resin in the reactor and large droplets can from larger particles of up to 0.5 cm which can be readily fluidized as long as the particle fraction is low enough, preferably less than about 10% and more preferably less than 2% by weight of the total resin in the bed.

Catalyst Droplet Size Control

The predicted droplet size of an effervescent spray can be readily calculated based on the following equations:

$$D_{32} = \left(\frac{3}{2}\sqrt{2\pi}\, d_L^3 \left[1 + \frac{3\mu_L}{\sqrt{\rho_L \sigma d_L}}\right]^{0.5}\right)^{1/3} \quad \text{Eq. 1}$$

$$\frac{4(d_L^2 + d_L d_A)}{d_A^2} = \frac{\rho_A sr}{\rho_L ALR} \quad \text{Eq. 2}$$

$$sr = \sqrt{\frac{\rho_L}{\rho_A}} \left(\frac{\sqrt{\alpha}}{1 + 75(1-\alpha)}\right)^{0.5} \quad \text{Eq. 3}$$

$$\alpha = \frac{1}{1 + \dfrac{\rho_A sr}{\rho_L ALR}} \quad \text{Eq. 4}$$

wherein $D_{32}$ is the diameter of the liquid droplet exiting the orifice in micrometers;

$\rho_L$ is the liquid density in g/cm$^3$;

$\rho_A$ is the gas density in g/cm$^3$ $\sigma$ is the surface tension in dyn/cm;

$\mu_L$ is the liquid viscosity in cP (1 cP=100 g/cm s)

Figure 2:
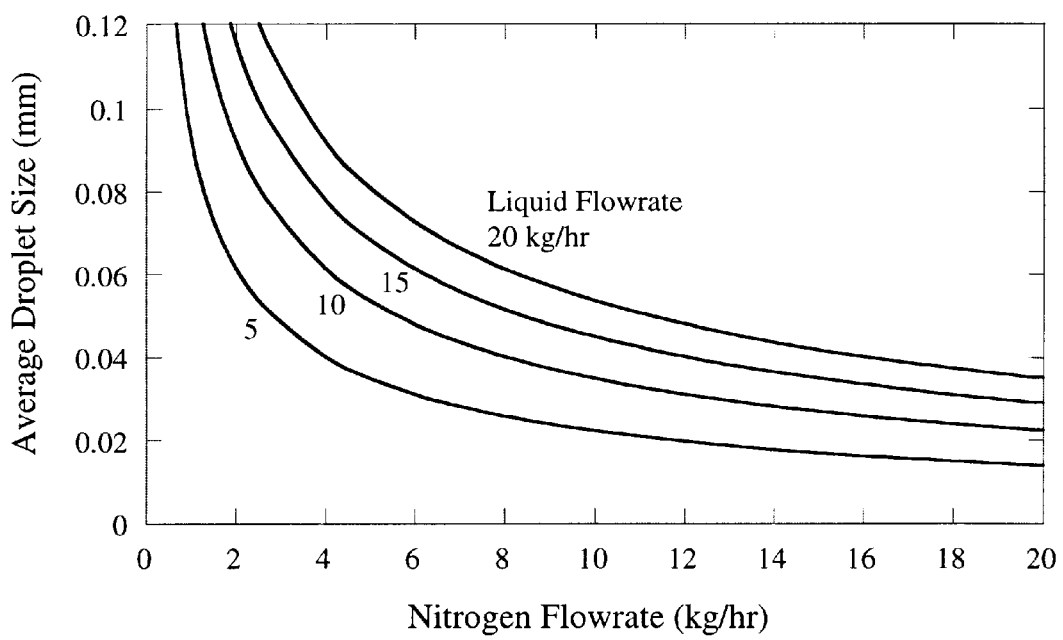
FIG. 2 is a graph indicating catalyst particle size dependence upon liquid catalyst and gas flow rates in an effervescent nozzle.

$d_L$ is the thickness of the liquid film on the orifice wall in cm;

$d_A$ is the diameter of the gas core in the center of the orifice in cm;

ALR is the gas to liquid mass flow ratio sr is the slip or velocity ratio of gas and liquid $\alpha$ is the volume fraction of gas in the orifice The results of sample calculations for an exemplary nozzle described below are illustrated in FIG. 2. The calculations are based on a nitrogen/isopentane system at 1962 kPa and 75° C. It can be seen that the average droplet size can be changed over the desired range very easily by changing the flow rate of total liquid and gas over a fairly narrow range.

For example, if 5 kg/hr of catalyst and cocatalyst were the desired flow rates to the reactor, and if no solvent were used and if the gas (e.g., nitrogen) feed rate were 15 kg/hr, then the estimated droplet size would be about 0.017 mm. If the gas feed rate were decreased to 5 kg/hr, and the total liquid rate was increased to 15 kg/hr by cofeeding 10 kg/hr of isopentane, then the estimated droplet size would be 0.069 mm. Thus, the droplet size is very sensitive to relatively small changes in the gas and liquid feed rates. This droplet size control is vital for control of the final resin particle size. In contrast, control of droplet size between 0.017 and 0.069 millimeters with an injection tube would be possible only with unacceptably high flowrates of atomization gas, 5–10 times higher than those listed above.

The use of this drop size/flow rate model may be operationally linked (via computer, live operator or other means) to specific reactor conditions and controls, which would allow control of the catalyst drop size in relation to polymer particle size in the reactor. The polymer bulk density is known to decrease in the presence of the undesired larger particles. With bulk density fluctuations there are commensurate changes in the bed level and the breadth of the fluidization bands depicting the oscillations of the bed. If the polymer particles are too small, they tend to accumulate in the top of the reactor and can be discerned by detecting changes of the fluidized bulk density, bed level and high bed level. Based on such readings, appropriate changes can be made to the liquid and gas flows in the nozzle to adjust the particles to within a desired range to maintain the resin size during the course of polymerization. Such control may be accomplished separately from catalyst flow rate if a liquid diluent is used for the catalyst, i.e., the diluent level may be controlled separately from the catalyst feed rate. As can be understood by one of skill in the art, this may be done using automated control technology.

Additional control of average particle size may be achieved by using multiple effervescent nozzles or a combination of effervescent and other atomization devices, each creating a unique droplet size. The relative catalyst feedrates then can be changed to control the overall average particle size. Furthermore, multiple nozzles could be used to spray different catalysts, of differing solvent compatibilities and particle formation tendencies, to produce polymers of broad or bimodal molecular weight and comonomer distributions in a single reactor.

Catalyst. Any type of polymerization catalyst may be used in the present process, provided it is stable and sprayable or atomizable when in liquid form. A single liquid catalyst may be used, or a liquid mixture of catalysts may be employed if desired. These catalysts are used with cocatalysts and promoters well known in the art. Examples of suitable catalysts include:

A. Ziegler-Natta catalysts, including titanium based catalysts such as those described in U.S. Pat. Nos. 4,376,062 and 4,379,758. Ziegler-Natta catalysts are typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Metallocene catalysts.

E. Cationic forms of metal halides, such as aluminum trihalides.

F. Cobalt catalysts and mixtures thereof such as those described in U.S. Pat. Nos. 4,472,559 and 4,182,814.

G. Nickel catalysts and mixtures thereof such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. Neodymium compounds, particularly neodymium neodecanoate, octanoate, and versatate, are the most preferred rare earth metal catalysts. Rare earth catalysts are used to produce polymers polymerized using butadiene or isoprene.

Preferred among these different catalyst systems are catalyst compositions comprising a metallocene catalyst in liquid form and an activating cocatalyst. The practice of this invention is not limited to any particular class or kind of metallocene catalyst. Accordingly, the catalyst composition may comprise any unsupported metallocene catalyst useful in slurry, solution, bulk, or gas phase olefin polymerization. One or more than one metallocene catalyst may be employed. For example, as described in U.S. Pat. No. 4,530,914, at least two metallocene catalysts may be used in a single catalyst composition to achieve a broadened molecular weight distribution polymer product.

Metallocene catalysts are organometallic coordination complexes of one or more $\pi$-bonded moieties in association with a metal atom from Groups IIIB to VIII or the rare earth metals of the Periodic Table.

Bridged and unbridged mono-, bis-, and tris-cycloalkadienyl/metal compounds are the most common metallocene catalysts, and generally are of the formula:

$$(L)_y R^1{}_z (L')MX_{(x-y-1)} \quad \text{(II)}$$

wherein M is a metal from groups IIIB to VIII of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is a $C_1$–$C_4$ substituted or unsubstituted alkylene radical, a dialkyl or diaryl germanium or silicon, or an alkyl or aryl phosphine or amine radical bridging L and L'; each X is independently hydrogen, an aryl, alkyl, alkenyl, alkylaryl, or arylalkyl radical having 1–20 carbon atoms, a hydrocarboxy radical having 1–20 carbon atoms, a halogen, $R^2 CO_2$—, or $R^2{}_2 NCO_2$—, wherein each $R^2$ is a hydrocarbyl group containing 1 to about 20. carbon atoms; n and m are each 0, 1, 2, 3, or 4; y is 0, 1, or 2; x is 1, 2, 3, or 4 depending upon the valence state of M; z is 0 or 1 and is 0 when y is 0; and x-y≧1.

Illustrative but non-limiting examples of metallocene catalysts represented by formula II are dialkyl metallocenes such as bis(cyclopentadienyl)titanium dimethyl, bis(cyclopentadienyl)titanium diphenyl, bis(cyclopentadienyl)zirconium dim ethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=$CH_2$ and derivatives of this reagent; substituted bis(cyclopentadienyl)titanium (IV) compounds such as: bis(indenyl)titanium diphenyl or dichloride, bis(methylcyclopentadienyl)titanium diphenyl or dihalide; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl(cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl) zirconium dichloride, diisopropylmethylene (cyclopentadienyl)(fluorenyl)-zirconium dichloride, diisobutylmethylene(cyclopentadienyl)(fluorenyl) zirconium dichloride, ditertbutylmethylene (cyclopentadienyl)-(fluorenyl)zirconium dichloride, cyclohexylidene (cyclopentadienyl)-(fluorenyl)zirconium dichloride, diisopropylmethylene (2,5-dimethylcyclopentadienyl) (fluorenyl)zirconium dichloride, isopropyl (cyclopentadienyl)(fluorenyl)hafnium dichloride, diphenylmethylene (cyclopentadienyl)(fluorenyl)hafnium dichloride, diisopropylmethylene(cyclopentadienyl)(fluorenyl)hafnium dichloride, diisobutylmethylene(cyclopentadienyl) (fluorenyl)hafnium dichloride, ditertbutylmethylene (cyclopentadienyl)(fluorenyl)hafnium dichloride, cyclohexylidene(cyclopentadienyl)(fluorenyl)hafnium dichloride, diisopropylmethylene(2,5-dimethylcyclopentadienyl)(fluorenyl)-hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl) (fluorenyl)titanium dichloride, diisobutylmethylene (cyclopentadienyl) (fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl fluorenyl)titanium dichloride, racemic-ethylene bis (1-indenyl) zirconium (IV) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1, 1,2,2-tetramethylsilanylene bis (1-indenyl) zirconium (IV) dichloride, racemic-1,1,2,2-tetramethylsilanylene bis (4,5,6, 7-tetrahydro-1-indenyl) zirconium (IV) dichloride, ethylidene (1-indenyl tetramethylcyclopentadienyl) zirconium (IV) dichloride, racemicdimethylsilyl bis (2-methyl-4-t-butyl-1-cyclopentadienyl) zirconium (IV) dichloride, racemic-ethylene bis (1-indenyl) hafnium (IV) dichloride, racemic-ethylene bis (4,5,6,7-tetrahydro-1-indenyl) hafnium (IV) dichloride, racemic-dimethylsilyl bis (1-indenyl) hafnium (IV) dichloride, racemic-dimethylsilyl bis (4,5,6,7-tetrahydro-1-indenyl) hafnium (IV) dichloride, racemic-1,1,2,2-tetramethylsilanylene bis (1-indenyl) hafnium (IV) dichloride, racemic-1,1,2,2-tetramethylsilanylene bis (4,5,6,7-tetrahydro-1-indenyl) hafnium (IV), dichloride, ethylidene (1-indenyl-2,3,4,5-tetramethyl-1-cyclopentadienyl) hafnium (IV) dichloride, racemic-ethylene bis (1-indenyl) titanium (IV) dichloride, racemic-ethylene bis (4,5,6,7-tetrahydro-1-indenyl) titanium (IV) dichloride, racemic-dimethylsilyl bis (1-indenyl) titanium (IV) dichloride, racemic-dimethylsilyl bis (4,5,6,7-tetrahydro-1-indenyl) titanium (IV) dichloride, racemic-1,1, 2,2-tetramethylsilanylene bis (1-indenyl) titanium (IV) dichloride racemic-1,1,2,2-tetramethylsilanylene bis (4,5,6, 7-tetrahydro-1-indenyl) titanium (IV) dichloride, and ethylidene (1-indenyl-2,3,4,5-tetramethyl-1-cyclopentadienyl) titanium IV) dichloride.

Particularly preferred metallocene catalysts have one of the following formulas (III or IV):

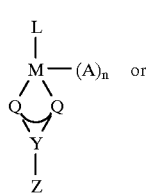

(III)

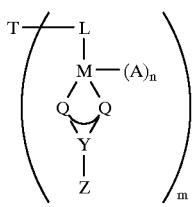
(IV)

wherein:
- M is a metal from groups IIIB to VIII, preferably Zr or Hf,
- L is a substituted or unsubstituted, π-bonded ligand coordinated to M, preferably a substituted cycloalkadienyl ligand;
- each Q is independently selected from the group consisting of —O—, —NR$^3$—, —CR$^3_2$ _ and —S—, preferably oxygen;
- Y is either C or S, preferably carbon;
- Z is selected from the group consisting of —OR$^3$, —NR$^3_2$, —CR$^3_3$, —SR$^3$, —SiR$^3_3$, —PR$^3_2$, and —H, with the proviso that when Q is —NR$^3$— then Z is selected from the group consisting of —OR$^3$, —NR$^3_2$, —SR$^3$, —SiR$^3_3$, —PR$^3_2$, and —H, preferably Z is selected from the group consisting of —OR$^3$, —CR$^3_3$, and —NR$^3_2$;
- n is 1 or 2;
- A is a univalent anionic group when n is 2 or A is a divalent anionic group when n is 1, preferably A is a carbamate, carboxylate or other heteroallyl moiety described by Q, Y and Z combination; and each R$^3$ is independently a group containing carbon, silicon, nitrogen, oxygen, and/or phosphorus and one or more R$^3$ groups may be attached to the L substituent, preferably R$^3$ is a hydrocarbon group containing from 1 to 20 carbon atoms, most preferably an alkyl, cycloalkyl or an aryl group;
- T is a bridging group selected from the group consisting of alkylene or arylene groups containing from 1 to 10 carbon atoms optionally substituted with carbon or heteroatoms, germanium, silicone and alkyl phosphine; and
- m is 1 to 7, preferably 2 to 6, most preferably 2 or 3.

The supportive substituent formed by Q, Y and Z is a unicharged polydentate ligand exerting electronic effects due to its high polarizability, similar to the cyclopentadienyl group. In the most preferred embodiments of this invention, the disubstituted carbamates,

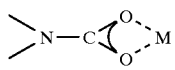

and the carboxylates

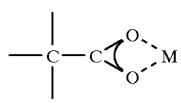

are employed.

Examples of metallocene catalysts according to formulas III and IV include indenyl zirconium tris(diethylcarbamate), indenyl zirconium tris(pivalate), indenyl zirconium tris(p-toluate), indenyl zirconium tris(benzoate), (1-methylindenyl) zirconium tris(pivalate), (2-methylindenyl) zirconium tris(diethylcarbamate), (methylcyclopentadienyl) zirconium tris(pivalate), cyclopentadienyl tris(pivalate), and (pentamethylcyclopentadienyl)zirconium tris(benzoate). Preferred examples of these metallocene catalysts are indenyl zirconium tris(diethylcarbamate) and indenyl zirconium tris(pivalate).

Another type of metallocene catalyst that can be used in accordance with the invention is a constrained geometry catalyst of the formula:

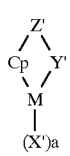
(V)

wherein:
- M is a metal of Group IIIB to VIII of the Periodic Table of the Elements:
- Cp is a cyclopentadienyl or substituted cyclopentadienyl group bound in an η$^5$ bonded mode to M;
- Z' is a moiety comprising boron, or a member of Group IVB of the Periodic Table of the Elements and optionally sulfur or oxygen, the moiety having up to 20 non-hydrogen atoms, and optionally Cp and Z' together form a fused ring system;
- X' is an anionic ligand group or a neutral Lewis base ligand group having up to 30 non-hydrogen atoms;
- a is 0, 1, 2, 3 or 4 depending on the valance of M; and
- Y' is an anionic or non-anionic ligand group bonded to Z' and M comprising is nitrogen, phosphorus, oxygen or sulfur having up to 20 non-hydrogen atoms, and optionally Y' and Z' together form a fused ring system.

Constrained geometry catalysts are well known to those skilled in the art and are disclosed in, for example, U.S. Pat. Nos. 5,026,798 and 5,055,438 and published European Application No. 0 416 815 A2.

Illustrative but non-limiting examples of substituents Z', Cp, Y', X' and M in formula V are:

| Z' | Cp | Y' | X' | M |
|---|---|---|---|---|
| dimethylsilyl | cyclopentadienyl | t-butylamido | chloride | titanium |
| methylphenylsilyl | fluorenyl | phenylamido | methyl | zirconium |
| diphenylsilyl | indenyl | cyclohexylamido | | hafnium |
| tetramethylethylene | | oxo | | |
| ethylene | tetramethylcyclopentadienyl | | | |
| diphenylmethylene | | | | |

The invention is also useful with another class of single site catalyst precursors, di(imine) metal complexes, as described in PCT Application No. WO 96/23010, which is incorporated herein by reference.

The activating cocatalyst is capable of activating the metallocene catalyst. Preferably, the activating cocatalyst is one of the following: (a) branched or cyclic oligomeric poly(hydrocarbyl-aluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula [A$^+$][BR$_4^-$], where A$^+$ is a cationic Lewis or Bronsted acid capable of abstracting an alkyl, halogen, or hydrogen from the metallocene catalysts, B is boron, and R is a substituted aromatic hydrocarbon, preferably a perfluorophenyl radical; and (c) boron alkyls of the general formula BR$_3$, where R is as defined above.

Preferably, the activating cocatalyst is an aluminoxane such as methylaluminoxane (MAO) or modified methylaluminoxane (MMAO), or a boron alkyl. Aluminoxanes are preferred and their method of preparation is well known in the art. Aluminoxanes may be in the form of oligomeric linear alkyl aluminoxanes represented by the formula:

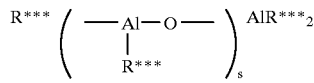

or oligomeric cyclic alkyl aluminoxanes of the formula:

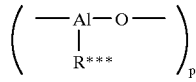

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of MAO, R* is methyl, whereas in MMAO, R* is a mixture of methyl and C2 to C12 alkyl groups wherein methyl comprises about 20 to 80 percent by weight of the R* group.

The amount of activating cocatalyst and metallocene catalyst usefully employed in preparation of the catalyst composition, whether the catalyst composition is formed in situ as it is being introduced into the reaction zone or formed prior to introduction into the reaction zone, can vary over a wide range. When the cocatalyst is a branched or cyclic oligomeric poly(hydrocarbylaluminum oxide), the mole ratio of aluminum atoms contained in the poly (hydrocarbylaluminum oxide) to metal atoms contained in the metallocene catalyst is generally in the range of from about 2:1 to about 100,000:1, preferably in the range of from about 10:1 to about 10,000:1, and most preferably in the range of from about 50:1 to about 2,000:1. When the cocatalyst is an ionic salt of the formula [A$^+$][BR*$_4^-$] or a boron alkyl of the formula BR*$_3$, the mole ratio of boron atoms contained in the ionic salt or the boron alkyl to metal atoms contained in the metallocene catalyst is generally in the range of from about 0.5:1 to about 10:1, preferably in the range of from about 1:1 to about 5:1.

The liquid catalyst can be composed of one or more of metal compounds in combination with one or more co-catalysts. Alternatively, all or a portion of the co-catalyst can be fed separately from the metal compound(s) to the reactor. Promoters associated with any particularly polymerization are usually added to the reactor separately from the co-catalyst and/or metal compound(s).

If the metal compound and/or the co-catalyst occurs naturally in liquid form, it can be introduced "neat" into the particle lean zone. More likely, the liquid catalyst is introduced into the particle lean zone as a solution (single phase, or "true solution" using a solvent to dissolve the metal compound and/or co-catalyst), an emulsion (partially dissolving the catalyst components in a solvent), suspension, dispersion, or slurry (each having at least two phases). Preferably, the liquid catalyst employed is a solution or an emulsion, most preferably a solution. As used herein, "liquid catalyst" or "liquid form" includes neat, solution, emulsion, colloids, suspension and dispersions of the transition metal or rare earth metal component(s) of the catalyst and/or co-catalyst.

The solvents which can be utilized to form liquid catalysts are inert solvents, preferably non-functional hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, tetrahydrofuran and the like; petroleum fractions such as gasoline, kerosene, light oils, and the like; and mineral oil. Likewise, halogenated hydrocarbons such as methylene chloride, chlorobenzene, ortho-chlorotoluene and the like may also be utilized. By "inert" is meant that the material being referred to is non-deactivating in the polymerization reaction zone under the conditions of gas phase polymerization and is non-deactivating with the catalyst in or out of the reaction zone. By "non-functional", it is meant that the solvents do not contain groups such as strong polar groups which can deactivate the active catalyst metal sites.

The concentration of the catalyst and/or co-catalyst that is in solution that is provided to the lean particle zone may be as high as the saturation point of the particular solvent being used. Preferably, the concentration is in the range of from about 0.01 to about 10,000 millimoles/liter. Of course, if the catalyst and/or co-catalyst is being used in its neat form, i.e., in its liquid state with no solvent, it will be comprised of essentially pure catalyst and/or co-catalyst, respectively.

Liquid flowrates of catalyst, cocatalyst, and activators range between 5 and 250 kg/hr for commerical scale gas-phase reactors, requiring gas flowrates in the range of 5 to 200 kg/hr Gas An important benefit of the effervescent nozzle is the low amount of inert gas required to atomize the liquid. It is known from atmospheric experiments (Lefebvre, A. H., *Atomization and Sprays*, (Taylor and Francis).) that effervescent nozzles can produce fine sprays at very low gas to liquid ratios, 0.03:1 to 0.05:1, unlike other gas-assisted nozzles which may require gas to liquid ratios as high as 3:1 to 5:1. At pressures used for gas-phase polymerizations, 1400 to 2800 kPa, a proportionately higher gas to liquid ratio is required to produce fine atomization. For example, at pressures twenty times higher than atmospheric, the mass flowrate of atomization gas to the nozzle must be increased by a factor of roughly 20 to maintain the same gas to liquid velocities, because of the reduced volume of the gas. Good operation of a commercial polymerization reactor has been achieved with gas to liquid mass flow ratios between 0.5:1 to 2:1. This represents a very efficient use of atomization gas.

The optional gases for use in the effervescent nozzle may be any relatively inert to the catalyst so that there is not blockage in the nozzle. Exemplary gases include $N_2$, Ar, He, $CH_4$, $C_2H_6$, $C_3H_8$, $CO_2$, $H_2$, cycle gas. Reactive gases (e.g., olefins) may be used if the catalyst is activated in the reactor, e.g., the cocatalyst is fed separately. The gas flow rates in the nozzle should be between about 2.5 and 100.0 kg/hr., depending upon the reactor size and particle size control as discussed above.

Other Material

The effervescent nozzle also may be used to deliver non-catalytic liquids to the reactor, e.g., solvents, anti-fouling agents, scavengers, monomers, antistatic agents, secondary alkyls, stabilizers or antioxidants. Some specific examples include methanol, veratrole, propylene oxide, glyme, water, Atmer-163, hydrogen, metal alkyls of the general formula $M^3R^5g$, where $M^3$ is a Group IA, IIA or IIIA metal, $R^5$ is an alkyl or aryl, and g is 1, 2, or 3; zinc alkyls, $CHCl_3$, $CFCl_3$, $CH_3CCl_3$, $CF_2ClCCl_3$, ethyltrichloroacetate, aluminum alkyls, most preferably triisobutylaluminum. The gas in such situations may be the cycle gas in a gas phase reactor that is operating in condensing mode or may be another inert gas, as is used with the delivery of the catalyst. The addition of this liquid can be any where to the reaction system, e.g., to the bed, beneath the bed, above the bed or to the cycle line. The use of these additives is well within the skill of those skilled in the art. These additives may be added to the reaction zone separately or independently from the liquid catalyst if they are solids, or as part of the catalyst provided they do not interfere with the desired atomization. To be part of the catalyst solution, the additives should be liquids or capable of being dissolved in the catalyst solution.

Nozzle Design

The effervescent nozzle for use herein should be able to withstand high pressures (up to 4200 kPa) and temperatures (up to 300° C.), and a harsh chemical environment (e.g., Aluminum alkyls, HCl, etc.). The nozzle should be able to deliver the spray at elevated pressures (3500 kPa). The nozzle should be easily and safely introduced and removed from a reactor without interrupting the reactor operation. The nozzle should not be easily plugged by suspended solid contaminants. The nozzle should not allow back-flow of reactive monomer.

The nozzle should not allow fouling from the polymer in the reactor. This may be accomplished through the use of a deflecting gas, i.e., gas that is used to reduce the particle density at or near the nozzle entrance, which allows the catalyst to enter the reactor at a particle-lean zone in the reactor, or preferably, enter at an area substantially free from polymer. If this deflecting gas flows past the orifice of the nozzle, it will sweep away any resin, keeping the orifice clear. How such a deflecting gas may be configured is disclosed in U.S. patent application Ser. No 08/659,764, now U.S. Pat No. 5,693,727.

The nozzle is constructed of any material which is not reactive under the selected polymerization conditions, including, but not limited to, aluminum, aluminum bronze, Hastalloy, Inconel, Incoloy, monel, chrome carbide, boron carbide, cast iron, ceramics, copper, nickel, silicon carbide, tantalum, titanium, zirconium, tungsten carbide, as well as certain polymeric compositions. Particularly preferred is stainless steel.

A preferred embodiment of an effervescent nozzle is depicted in FIG. 1. There is an outer tube 1 and an inner concentric tube 2. The tip 4 of the outer tube is tapered to a point, with an orifice 3, being present at this tip. The inner tube is seal at the tip 5, but has holes 6 along its length. It is noted, though, that the end of the smaller inner tube 5 may be open in certain instances. It is intended that the gas of the nozzle be fed into the inner tube 2 and the liquid catalyst in the outer tube 1, (though this may be reversed) both being fed in the same direction, flowing towards the orifice 3. The gas can form bubbles in the liquid as it exits through the holes 6. The gas forces the liquid to exit the orifice as a thin film on the walls, leading to thin ligaments and breakup to fine droplets after leaving the orifice.

It is noted, though not shown, there are means for delivering the liquid to the inlet of the outer tube 1 and gas to the inlet of the inner tube 2.

The inner tube could range from about 1/16" (0.159 cm) to 1/2" (1.27 cm), preferably about 1/8" (0.3175 cm) to 1/4" (0.635 cm). The outer tube could be as large as about 1" (2.54 cm), preferably about 1/2" (1.27 cm), and most preferably 1/4" (0.635 cm). The orifice can be between about 0.050 cm to 0.6 cm, preferably between about 0.1 cm and 0.25 cm. The holes in the inner tube could be between about 0.025 cm up to 0.3 cm in diameter, preferably between about 0.05 and 0.125 cm. There should be about 1 to 1000, preferably 10 to 100, holes 6 in the inner tube 2. The length of the inner tube, over which the holes are drilled, could be between about 0.5 and 25 cm though, preferably the holes are present in the last about 1 to 2 cm of the inner tube. The tip of the inner tube preferably should be about 0.25 to 0.75 cm back from the orifice, though, the tip could be moved closer to the orifice or could be moved back several centimeters.

The spray tip of the outer tube may have a variety of configurations, e.g., spherical, conical, or parabaloid; however, the spray tip of the outer tube preferably has a taper which is preferably about 5 to 15 degrees off horizontal and allows the gas to flow evenly around the nozzle tip with minimal turbulence. Turbulence creates back-flow that can deposit liquid catalyst on the nozzle outer body, which can subsequently undergo polymerization and foul the nozzle. Higher taper angles can be tolerated given that the taper off horizontal is gradual. The small tip also avoids fouling by not providing a large area for catalyst and polymer to accumulate.

As is known in the art, such effervescent nozzles may be made by other means and in other configurations. See, e.g., Lefebvre, A. H., *Atomization and Sprays*, (Taylor and Francis). The only requirement herein is that the concurrently flowing gas is forcing the liquid to break apart as they both exit the nozzle.

In a particular embodiment as depicted in FIG. 1, the outer tube tip 1 is 0.25" (0.635 cm) in outside diameter and the inside diameter of this outer tube 1 is 0.20" (0.508 cm). This tube 1 is machined to be approximately eight centimeters long. The tip 4 is tapered down to a 0.15-cm point. A 0.10-cm orifice 3 is drilled at the tip. A second inner tube 2 is situated on the inside of the nozzle tip, which is made from a 3.5-m length of 1/8" (0.3175 cm) standard stainless steel tubing. The end 5 is welded shut, into a semi-spherical tip, and twenty holes 6 of 0.05 cm in diameter are drilled into the end of this inner tube. The holes 6 are drilled in two lines of ten holes each. The holes 6 within a line are spaced over a five centimeter distance. Each of the two lines of holes 6 wraps around the nozzle tip in a helical pattern over one-quarter of the circumference. The two rows of holes 6 are offset by 90°.

The outer tube 1 of the nozzle is welded to a 3-m section of standard 1/4" (0.635 cm) stainless steel tubing. The 1/8- and 1/4" tubes are connected with a 1/4" standard SWAGELOK® tubing tee. The 1/4" tube (with the 1/8" tube mounted inside) connects to the run of the tee. A 1/4" to 1/8" adapter is used for the extension of the 1/8" out of the opposite run of the tee. A 1/4" line flows into the branch of the tee.

The gas enters the inside of the 1/8" line through the back run of the tee and passes to the tip of the 1/8" tube 2, where it is dispersed into the liquid and subsequently discharged through the orifice 3. The catalyst and cocatalyst solution are fed through the annular space between the two tubes 1, 2 through the branch of the tee. The catalyst solution is forced into a thin film at the orifice 4 and then efficiently atomized as it exits the orifice 4. The tip is located within a jet of tip-cleaning gas of 450 to 1360 kg/hr of ethylene, which can be preferably heated, which is in turn located within a jet of cycle gas of 4,000 to 30,000 kg/hr.

Polymers. Illustrative of the polymers which can be produced in accordance with the invention are the following: ethylene homopolymers and ethylene copolymers employing one or more $C_3$–$C_{12}$ alpha olefins; propylene homopolymers and propylene copolymers employing one or more $C_4$–$C_{12}$ alpha olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like. Preferably, polyethylene of 240 to 416 kg/m$^3$ is made.

Polymerization. The present invention is not limited to any specific type of gas phase polymerization reaction and can be carried out in a stirred or fluidized bed reactor. The invention can be carried out in a single reactor or multiple reactors (two or more reactors in series). In addition to well known conventional gas phase polymerizations processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream.

Condensed mode polymerizations are disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

Liquid monomer polymerization mode is disclosed, in U.S. Pat. No. 5,453,471, U.S. Ser. No. 510,375, PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer process are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

In a preferred embodiment of the present invention, the liquid catalyst in a carrier gas (e.g., nitrogen, argon, alkane, or mixtures thereof) is surrounded by at least one gas which serves to move or deflect resin particles of the bed out of the path of the liquid catalyst as it enters the fluidization zone and away from the area of catalyst entry, thereby providing a particle lean zone. The first or particle-deflecting gas can be selected from the group consisting of recycle gas, monomer gas, chain transfer gas (e.g., hydrogen), inert gas or mixtures thereof. Preferably the particle-deflecting gas is all or a portion of the recycle gas and the tip-cleaning gas is all or a portion of a monomer (e.g., ethylene or propylene) employed in the process.

EXAMPLES

The examples below demonstrate the use of the effervescent nozzle during the production of ethylene-hexene copolymer on a commercial scale reactor. A comparative example shows that hollow, flaky particles can be formed when standard injection tubes are used to spray catalyst into the reactor.

The catalyst used for all examples was a Zr based metallocene in a 2 wt % solution in n-hexane. The solution was used as received for Example 1. For Example 2, to this material was added 50 wt % of 1-hexene, so that the final catalyst concentration was 1.33 percent by weight.

The catalyst was mixed in line with MMAO 3A (modified methyl alumoxane) from Akzo Nobel at 7.1 wt % Al. Additional dilution was performed by adding isopentane to the mixture before introducing it to the reactor. Catalyst and MMAO feedrates were adjusted to provide a final Al:Zr molar ratio between 330 and 340.

The reactor was 2.4 m in diameter and was operated with a bed height of 11.6 m and a superficial gas velocity of approximately 0.6 m/sec. Total reactor pressure was 1962 kPa. ATMER-163 anti-stat (ICI Chemicals), was added as necessary to the reactor to control the buildup of electrostatic charge.

The catalyst atomization devices used in all examples were located at the end of a ¼" (0.635 cm) OD stainless steel tube, and they could be removed from the reactor during operation. This tube passes through a ¾-inch schedule-40 pipe (2.1 cm ID). A stream of 1000 to 1180 kg/hr of ethylene monomer at a temperature between 85° C. and 95° C. was fed through the annular space between the ¼-inch tube and the ¾-inch pipe. This monomer stream is referred to as a nozzle cleaning gas. The ¾-inch pipe was located in the center of a six-inch pipe (15.4 cm ID), through which was fed between 22,700 and 29,500 kg/hr of cycle gas, known as particle deflecting gas. The six-inch pipe extended 53 centimeters into the reactor, the ¾-inch pipe extended 61 centimeters into the reactor, and the spray nozzle extended 66 centimeters into the reactor, at a location 2.4 m above the distributor plate.

Comparative Example #1

A seed bed was charged to the reactor and it was dried to 45 ppm water. It was pressurized to 790 kPa of nitrogen and then 36 kg/hr of 10-wt % TEAL in isopentane were fed to the reactor over two hours and allowed to circulate for 1 hour. The reactor was filled with 1633 kPa of ethylene and with a hexene ratio of 0.033, and the temperature of the fluidized bed was adjusted to 76° C. Catalyst and MMAO were contacted with a static mixer near the injection point at the reactor so that their contact time before dilution with isopentane was approximately 30 seconds.

Catalyst and cocatalyst solution were fed to the reactor through an injection tube of 0.30-cm inside tip diameter with a stream of 54.5 kg/hr of nitrogen atomization gas. The reaction initiated immediately after the catalyst solution reached the reactor. Over the next 3 hours it was observed that hollow and flaky particles were being formed in the reactor with this spraying configuration. These particles were approximately 3 to 6 mm. During the first three hours of operation these particles grew in number so that they reached 1 wt % of all the resin in the reactor. Previous experience had shown that they could be expected to continue to grow in size and number until they caused operational difficulties. The average particle size decreased slightly from 0.704 to 0.648 mm over this period, indicative of the ability of the nozzle to form a large fraction of new particles. It would be expected, however, that the average particle size would eventually increase above an acceptable limit with continued formation of particles with flaky or hollow morphology.

Example #2

The reactor was operated for 10 days utilizing a different comparative nozzle. Then, the effervescent nozzle as described as an exemplary model above was installed within the pipe assembly of the tip cleaning and particle deflecting gases. The catalyst and MMAO were contacted for approximately 30 minutes before being diluted with isopentane and conveyed to the nozzle. The effervescent nozzle was more efficient in its use of atomization gas, so that only 6.3 to 8.1 kg/hr of nitrogen were required for fine droplet formation. The reactor was operated for two days with this nozzle without the formation of the hollow flaky particles described in Example 1. The particle morphology with the effervescent nozzle was a combination of spheres or small clusters of solid spherical particles, resulting in desirable average particle sizes between 0.50 to 0.76 mm, with settled bulk densities of 318 to 373 kg/m$^3$.

Control of Average Particle Size

During operation with the effervescent nozzle the ability to control the average particle size was demonstrated as shown in Table 1. Proper manipulation of the nitrogen atomization gas and the isopentane diluent allow for corrections in APS when it becomes either too small or too large.

The effervescent nozzle was first operated with a nitrogen carrier rate of 6.4 kg/hr and an isopentane feedrate of 7.7 kg/hr. This caused the APS to decrease from 0.610 to 0.508 mm (Example 2A). This trend downward was arrested by decreasing the amount of isopentane diluent in the catalyst from 7.7 to 3.6 kg/hr (Example 2B). This concentrated the catalyst so that each droplet grew larger in size. Agglomeration was also more likely with the increased catalyst concentration. As a result the APS increased to 0.559 mm.

The reactor then was transitioned so that the resin density decreased from 0.915 to 0.908 g/cm$^3$. The tendency is for increased agglomeration at lower densities, so the APS trended up to 0.762 mm (Example 2C). This is still a desirable APS, but control of APS was demonstrated by increasing the N$_2$ flowrate from 6.6 to 8.1 kg/hr, which decreased the droplet size, and by increasing the amount of isopentane from 3.6 to 5.4 kg/hr, which diluted the amount of catalyst in each new resin particle, thereby reducing its ultimate size. The APS was lowered back down to 0.584 mm (Example 2D).

TABLE 1

| Example | 1 | 2A | 2B | 2C | 2D |
| --- | --- | --- | --- | --- | --- |
| Atomization Device | Injection tube | Effervescent Nozzle | Effervescent Nozzle | Effervescent Nozzle | Effervescent Nozzle |
| Catalyst feedrate (kg/hr) | 0.66 | 0.30 | 0.30 | 0.43 | 0.36 |
| MMAO feedrate (kg/hr) | 3.3 | 1.1 | 1.1 | 1.5 | 1.3 |
| isopentane feedrate (kg/hr) | 5.9 | 7.7 | 3.6 | 3.6 | 5.4 |
| Nitrogen feedrate (kg/hr) | 54.5 | 6.4 | 6.3 | 6.6 | 8.1 |
| Reactor temperature (°C.) | 76 | 75 | 75 | 70 | 70 |

TABLE 1-continued

| Example | 1 | 2A | 2B | 2C | 2D |
|---|---|---|---|---|---|
| Ethylene partial pressure (kPa) | 1585 | 1448 | 1448 | 1516 | 1516 |
| Molar C6/C2 ratio | 0.033 | 0.0285 | 0.0289 | 0.0318 | 0.0327 |
| Resin density (g/cc) | 0.91 | 0.915 | 0.915 | 0.908 | 0.0907 |
| Average particle size (mm) | | | | | |
| Initial | 0.704 | 0.610 | 0.457 | 0.533 | 0.762 |
| Final | 0.648 | 0.508 | 0.559 | 0.762 | 0.584 |
| Bulk density (kg/m$^3$) | 358 | 373 | 362 | 346 | 318 |
| Morphology | Clusters of small spheres 1 wt % flakes and hollow particles of 3 to 6 mm | Spheres and clusters | Spheres and clusters | Spheres and clusters | Spheres and clusters |

We claim:

1. A method of polymerizing olefins in the presence of at least one liquid catalyst comprising polymerizing at least one olefin in at least one gas phase polymerization reactor in the presence of a catalytically effective amount of the liquid catalyst, whereby the liquid catalyst is delivered to the polymerization reactor with an effervescent nozzle.

2. A method according to claim 1 wherein the effervescent nozzle has a gas feed stream and a liquid catalyst feed stream.

3. A method according to claim 2 wherein the flow rates of the liquid and gas streams are determined based on polymerization reactor conditions.

4. A method according to claim 2 wherein the liquid catalyst feed stream additionally contains a liquid other than a catalyst.

5. A method according to claim 2 wherein the gas is selected from the group consisting of $N_2$, Ar, He, $CH_4$, $C_2H_6$, $C_3H_8$, $CO_2$, and $H_2$.

6. A process according to claim 1 wherein a particle deflecting gas allows the catalyst to enter the reactor in a low polymer density zone.

7. A method according to claim 3 wherein the liquid catalyst is fed through multiple effervescent nozzles, each nozzle controlled to deliver different catalyst drop sizes.

8. A method according to claim 2 wherein the method of polymerizing has a recycle line and operates in condensing mode.

9. A method according to claim 2 wherein the liquid is selected from a slurry of supported catalyst, or a slurry of prepolymerized catalyst.

10. A method according to claim 1 additionally comprising feeding a cocatalyst to the reactor other than through the effervescent nozzle.

11. A method according to claim 3, wherein the flow rate and composition of the gas feed stream and liquid catalyst feed stream are selected such that the viscosity, surface tension and density of the liquid, the density of the gas and their relative flow ratios can be used to calculate the catalyst particle size delivered to the at least one polymerization reactor according to the following equations:

$$D_{32} = \left(\frac{3}{2}\sqrt{2\pi}\, d_L^3 \left[1 + \frac{3\mu_L}{\sqrt{\rho_L \sigma d_L}}\right]^{0.5}\right)^{1/3}$$

$$\frac{4(d_L^2 + d_L d_A)}{d_A^2} = \frac{\rho_A sr}{\rho_L ALR}$$

$$sr = \sqrt{\frac{\rho_L}{\rho_A}} \left(\frac{\sqrt{\alpha}}{1 + 75(1-\alpha)}\right)^{0.5}$$

$$\alpha = \frac{1}{1 + \frac{\rho_A sr}{\rho_L ALR}}$$

wherein:

$D_{32}$ is the diameter of the liquid droplet exiting the orifice in micrometers;

$\rho_L$ is the liquid density in g/c$^3$;

$\rho_A$ is the gas density in g/cm$^3$ $\sigma$ is the surface tension in dyn/cm;

$\mu_L$ is the liquid viscosity in cP (1 cP=100 g/cm s)

$d_L$ is the thickness of the liquid film on the orifice wall in cm;

$d_A$ is the diameter of the gas core in the center of the orifice in cm;

ALR is the gas to liquid mass flow ratio;

sr is the slip or velocity ratio of gas and liquid; and $\alpha$ is the volume fraction of gas in the orifice.

12. A method according to claim 1, wherein the liquid catalyst is a metallocene catalyst.

13. A method according to claim 12, wherein the metallocene catalyst is represented by the following formula:

$$(L)_y R^1_z (L')MX_{(x-y-1)} \qquad (II)$$

wherein:

M is a metal selected from groups IIIB to VIII of the Periodic Table;

L and L' are the same or different and are π-bonded ligands coordinated to M;

$R^1$ is selected from the group consisting of a $C_1$–$C_4$ substituted or unsubstituted alkylene radical, a dialkyl or diaryl germanium, a dialkyl or diaryl silicon, an alkyl or aryl phosphine, an alkyl amine and an aryl amine radical bridging L and L';

X is independently hydrogen, an aryl, alkyl, alkenyl, alkylaryl, or arylalkyl radical having 1–20 carbon atoms, a hydrocarboxy radical having 1–20 carbon atoms, a halogen, $R^2CO_2$—, or $R^2{}_2NCO_2$—, wherein each $R^2$ is a hydrocarbyl group containing 1 to about 20 carbon atoms;

y is 0, 1, or 2;

x is 1, 2, 3, or 4 depending upon the valence state of M;

z is 0 or 1 and is 0 when y is 0; and $(x-y) \geq 1$.

14. A method according to claim 12, wherein the metallocene catalyst has a formula selected from the following formula (III) or (IV)

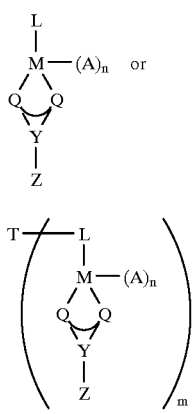

wherein:

M is a metal selected from groups IIIB to VIII;

L is a substituted or unsubstituted, π-bonded ligand coordinated to M;

Q is independently selected from the group consisting of —O—, —$NR^3$—, —$CR^3_2$— and —S—, where each $R^3$ is independently a group containing carbon, silicon, nitrogen, oxygen, and/or phosphorus and one or more $R^3$ groups may be attached to the L substituent;

Y is either C or S;

Z is selected from the group consisting of —$OR^3$, —$NR^3_2$, —$CR^3_3$, —$SR^3$, —$SiR^3_3$, —$PR^3_2$, and —H, with the proviso that when Q is —$NR^3$— then Z is selected from the group consisting of —$OR^3$, —$NR^3_2$, —$SR^3$, —$SiR^3_3$, —$PR^3_2$, and —H;

n is 1 or 2;

A is a univalent anionic group when n is 2 or A is a divalent anionic group when n is 1;

T is a bridging group selected from the group consisting of alkylene groups containing from 1 to 10 carbon atoms optionally substituted with carbon or heteroatoms, arylene groups containing from 1 to 10 carbon atoms optionally substituted with carbon or heteroatoms, germanium, silicone and alkyl phosphine; and m is 1 to 7.

15. A method according to claim 14, wherein the metallocene catalyst is selected from the group consisting of indenyl zirconium tris(diethylcarbamate), indenyl zirconium tris(pivalate), indenyl zirconium tris(p-toluate), indenyl zirconium tris(benzoate), (1-methylindenyl) zirconium tris (pivalate), (2-methylindenyl) zirconium tris (diethylcarbamate), (methylcyclopentadienyl) zirconium tris(pivalate), cyclopentadienyl tris(pivalate), and (pentamethylcyclopentadienyl) zirconium tris(benzoate).

16. A method according to claim 12, wherein the metallocene catalyst is represented by the following formula (V):

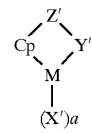

wherein:

M is a metal selected from Group IIIB to VIII of the Periodic Table;

Cp is a cyclopentadienyl or substituted cyclopentadienyl group bound in an $\eta^5$ bonded mode to M;

Z' is a moiety comprising boron, or a member of Group IVB of the Periodic Table, and optionally sulfur or oxygen, the moiety having up to 20 non-hydrogen atoms, and optionally Cp and Z' together form a fused ring system;

X' is an anionic ligand group or a neutral Lewis base ligand group having up to 30 non-hydrogen atoms;

a is 0, 1, 2, 3 or 4 depending on the valance of M; and

Y' is an anionic or non-anionic ligand group bonded to Z' and M selected from the group consisting of nitrogen, phosphorus, oxygen and sulfur, said ligand having up to 20 non-hydrogen atoms, and optionally Y' and Z' together form a fused ring system.

17. A method according to claim 1, wherein the effervescent nozzle delivers liquid catalyst having a droplet size within the range of from 0.01 mm to 0.075 mm.

18. A method according to claim 5, wherein the gas is $N_2$.

19. A method of delivering a liquid catalyst to a gas phase polymerization reactor comprising feeding a catalytically effective amount of a liquid catalyst to a gas phase polymerization reactor with an effervescent nozzle.

* * * * *